UNITED STATES PATENT OFFICE 2,339,984

ANTISKINNING AGENT

Michael A. Eitelman, Hamburg, N. Y., assignor to Allied Chemical & Dye Corporation, a corporation of New York No Drawing. Application November 8, 1940,
Serial No. 364,841

10 Claims. (Cl. 106—262)

This invention relates to coating compositions. Many types of air-hardenable coating compositions, such as paints, varnishes, enamels, and lacquers, when exposed in bulk to air either in open or closed containers, tend to develop tough, rubber-like skins over or near exposed surfaces or to become thick or livery, and no amount of stirring will serve to restore their normal homogeneous character. It is obvious that this capacity for becoming heterogeneous, hereinafter referred to as "skinning," is not merely the result of gravitational separation of constituents, such as results when a heavy pigment settles in a lighter vehicle, but is chemical in nature. Skinning is generally attributed to oxidation or polymerization in the presence of oxygen of certain constituents, such as drying oils or resins (vehicular constituents of paints and enamels), which give to the compositions their ability to "air-harden" and thus to form durable coatings. Since this property of air-hardening is necessary for the normal uses of such compositions, it is apparent that efforts to eliminate so-called skinning and related phenomena must at the same time avoid an objectionable loss of the air-hardening properties of the compositions in film form.

It is known that many organic compounds, when present in such coating compositions, prevent or at least inhibit the skinning previously referred to, and materials which inhibit these effects will be referred to herein as "antiskinning agents." However, if the previously known antiskinning agents are added in proportions much above those required to develop their antiskinning properties, they tend either to prolong unduly the period required to air-harden or to inhibit entirely air-hardening of the compositions in film form. The allowable concentrations differ according to the nature of the coating compositions. The maximum concentration suitable for one type of composition may be too large for another and may retard drying of the latter to an objectionable degree. On the other hand, the minimum concentration suitable for one coating composition may be inadequate to prevent development of skinning effects in another. The maximum concentrations employable with such agents are not over about 0.2 gram of antiskinning agent per 100 ccs. of coating composition. In view of the lack of uniformity of results obtainable with antiskinning agents of the prior art, it was necessary to conduct tests of each antiskinning agent to determine both its effect on the coating composition in bulk form and its effect on the composition in film form, and to carefully control the proportions of antiskinning agent on the basis of the results of such tests. Such accurate control is highly inconvenient, but the only alternative was the production of products exhibiting serious skinning effects or products of widely variant and unpredictable skinning and air-hardening properties.

In my prior application Serial No. 315,752, filed January 26, 1940, I have described a new class of antiskinning agents which have the property of inhibiting skinning or loss of the normal homogeneous character of air-hardenable coating compositions if present in even very low concentrations in such compositions, but which may be present in much higher concentrations without adversely affecting the drying of such compositions in film form. The broad class of antiskinning agents covered by that application may be defined as organic anti-oxidants which boil below 160° C. and the especially preferred antiskinning agents set forth in that application are the oximes containing at least two and not more than six carbon atoms in the molecule.

In accordance with the present invention it has been found that azones, i. e., organic compounds containing the tetravalent azono group C:N—N, are highly advantageous antiskinning agents and may be used in unusually widely variant proportions to satisfactorily inhibit skinning without adversely affecting the drying rate of the compositions containing them.

The azones embrace collectively the symmetrical and the unsymmetrical, alkylidene (including methylene), cycloalkylidene, and aralkylidene azines, and are represented by the general formula R:N—N:X, wherein R represents an alkylidene, cycloalkylidene, or aralkylidene radical and X represents either a divalent group such as R or a pair of like or unlike monovalent radicals or elements, e. g., hydrogen atoms or alkyl, cycloalkyl, or aryl groups. Thus the aldazines and ketazines and the hydrazones of aldehydes and ketones are within this general class.

The preferred antiskinning agents of the present invention are the symmetrical azones which boil below 160° C.

The use of the antiskinning agents of the present invention, especially those which boil below 160° C., is particularly advantageous in the case of rapid-drying, oily, air-hardenable coating compositions, especially those which contain metal compounds, for example, japan driers, siccatives, pigments, etc. The term "rapid-drying," with reference to coating compositions, is used herein to designate compositions such as household varnishes, enamels and lacquers which dry at least in part by oxidation in less than 24 hours, for example "4-hour enamel." In such compositions the said antiskinning agents of the present invention effectively inhibit skinning of the compositions during application and storage, do not materially retard the drying thereof after application, and do not form relatively non-volatile anti-oxidant materials in effective amounts as a result of contact with the air and/or with the other ingredients of the coating compositions.

Normally a wide latitude is permissible in the proportions of the antiskinning agent which may be used. Effective proportions vary from as little as 0.2 gram up to 2 grams of antiskining agent per 100 cubic centimeters of coating composition, without retarding film drying. This broad range is particularly applicable to the preferred antiskinning agents. It is to be understood, however, that my invention contemplates, in a broad sense, the use of the antiskinning agents thereof whether or not they alter the film drying rate since in many cases retarded drying is not objectionable and in some cases may be desirable.

The following compounds are examples of azones suitable for the purposes of my invention:

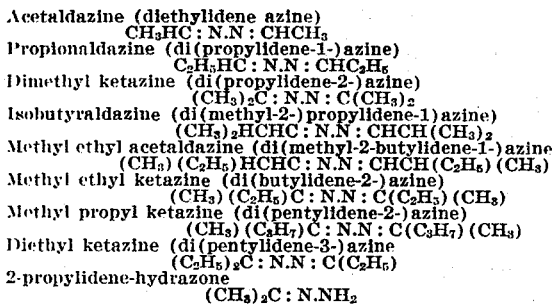

Of the above compounds the first three, which are symmetrical azones and boil below 160° C., represent the preferred antiskinning agents of the invention.

The following examples further illustrate the present invention.

*Example 1*

Three 20 cc. portions of a commercial 4-hour enamel were placed in three 6" x ¾" test tubes. To the first portion no addition was made; to the second portion 2 ccs. of toluene were added; and to the third portion 2 ccs. of toluene containing 5 grams of acetaldazine per 100 ccs. were added. The contents of each of the three test tubes were thoroughly and quickly mixed. The tubes were stoppered lightly in a manner to prevent circulation of air above the tube contents, but not to prevent such "breathing" as might be caused by changes of temperature in the tubes or in the vicinity of the tubes or by absorption of constituents (for example oxygen) from the air in the tubes. The tubes were examined periodically for signs of skinning. A skin on the surface of the composition was considered to have formed when it had sufficient tensile strength to support the composition as the tube under examination was slowly and completely inverted. The time required for development of skin in the portion of the enamel to which no addition was made and in the portion to which only two ccs. of toluene were added was less than 24 hours. The portion of enamel to which acetaldazine had been added showed no skinning after 33 days of observation. Portions of the same enamel alone and with toluene and toluene solution of acetaldazine in the above proportions, were also exposed in film form, and the rates of drying of the films were noted to determine whether the acetaldazine affected the drying qualities of the compositions. No difference in drying time was observed among the three portions of enamel so tested.

*Example 2*

This test was made for the purpose of determining whether an adequate latitude existed in the range of proportions between the minimum effective proportion of acetaldazine and the maximum which would not hinder drying.

Portions of a commercial quick-drying flat varnish were treated with 0.5 gram and 2.0 grams of acetaldazine per 100 ccs. of varnish, respectively. The treated samples were placed in test tubes and examined in the manner described above in Example 1. Simultaneously the drying rates of films of the varnish with and without addition of acetaldazine were noted. An addition of 0.5 gram of acetaldazine per 100 ccs. of varnish prevented skinning within 24 hours. An addition of 2.0 grams per 100 ccs. did not visibly affect the drying of the varnish film.

The present application is in part a continuation of my application Serial No. 315,752, filed January 26, 1940, now Patent No. 2,306,016, patented December 22, 1942, and entitled "Antiskinning agents."

I claim:

1. An air-hardenable coating composition comprising (a) an air-hardenable mixture which loses its normal homogeneous character when exposed in bulk to air for a substantial period and (b) a proportion of an azone sufficient to inhibit the loss of the aforesaid homogeneous character.

2. An air-hardenable coating composition comprising (a) an air-hardenable mixture which loses its normal homogeneous character when exposed in bulk to air for a substantial period and (b) a proportion of a symmetrical azone boiling below 160° C. sufficient to inhibit the loss of the aforesaid homogeneous character.

3. An air-hardenable coating composition comprising (a) an air hardenable mixture which loses its normal homogeneous character when exposed in bulk to air for a substantial period and (b) a proportion of acetaldazine sufficient to inhibit the loss of the aforesaid homogeneous character but insufficient to materially alter the film drying rate of the composition.

4. An air-hardenable coating composition comprising (a) an air-hardenable mixture which loses its normal homogeneous character when exposed in bulk to air for a substantial period and (b) a proportion of propionaldazine sufficient to inhibit the loss of the aforesaid homogeneous character but insufficient to materially alter the film drying rate of the composition.

5. An air-hardenable coating composition comprising (a) an air-hardenable mixture which loses its normal homogeneous character when exposed in bulk to air for a substantial period and (b) a proportion of dimethyl-ketazine sufficient to inhibit the loss of the aforesaid homogeneous character but insufficient to materially alter the film drying rate of the composition.

6. An air-hardenable coating composition comprising (a) an air-hardenable drying colcontaining mixture which loses its normal homogeneous character when exposed in bulk to air for a substantial period and (b) a proportion of a symmetrical azone boiling below 160° C. sufficient to inhibit the loss of the aforesaid homogeneous character.

7. An air-hardenable coating composition comprising (a) an air-hardenable drying-oil-containing mixture which loses its normal homogeneous character when exposed in bulk to air for a substantial period and (b) between 0.2 gram and 2 grams of a symmetrical azone boiling below 160° C. per 100 cubic centimeters of coating composition.

8. An air-hardenable coating composition comprising (a) an air-hardenable drying-oil-containing mixture which loses its normal homogeneous character when exposed in bulk to air for a substantial period and (b) between 0.2 gram and 2 grams of acetaldazine per 100 cubic centimeters of coating composition.

9. An air-hardenable coating composition comprising (a) an air-hardenable drying-oil-containing mixture which loses its normal homogeneous substantial period and (b) between 0.2 gram and 2 grams of propionaldazine per 100 cubic cubic centimeters of coating composition.

10. An air-hardenable coating composition comprising (a) an air-hardenable drying-oil-containing mixture which loses its normal homogeneous character when exposed in bulk to air for a substantial period and (b) between 0.2 gram and 2 grams of dimethyl-ketazine per 100 cubic centimeters of coating composition.

MICHAEL A. EITELMAN.

CERTIFICATE OF CORRECTION.

Patent No. 2,339,984. January 25, 1944.

MICHAEL A. EITELMAN.

It is hereby certified that error appears in the printed specification of the above numbered patent requiring correction as follows: Page 2, first column, line 3, for "ex-" read --example--; and second column, line 75, for "col-" read -- oil-- ; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.

CERTIFICATE OF CORRECTION.

Patent No. 2,339,984.  January 25, 1944.

MICHAEL A. EITELMAN.

It is hereby certified that error appears in the printed specification of the above numbered patent requiring correction as follows: Page 2, first column, line 3, for "ex-" read --example--; and second column, line 75, for "col-" read -- oil-- -; and that the said Letters Patent should be read with this correction therein that the same may conform to the record of the case in the Patent Office.

Signed and sealed this 28th day of March, A. D. 1944.

Leslie Frazer (Seal)                  Acting Commissioner of Patents.